US010263666B2

(12) United States Patent
Gerszberg et al.

(10) Patent No.: US 10,263,666 B2
(45) Date of Patent: *Apr. 16, 2019

(54) INTERFERENCE CONTROL IN A BROADBAND POWERLINE COMMUNICATION SYSTEM

(71) Applicant: AT&T Intellectual Property II, L.P., Atlanta, GA (US)

(72) Inventors: Irwin Gerszberg, Kendall Park, NJ (US); Paul Shala Henry, Holmdel, NJ (US); Larrie G. Sutliff, Briarcliff Manor, NY (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/691,232

(22) Filed: Aug. 30, 2017

(65) Prior Publication Data
US 2017/0366229 A1    Dec. 21, 2017

Related U.S. Application Data

(63) Continuation of application No. 14/863,811, filed on Sep. 24, 2015, now Pat. No. 9,780,835, which is a
(Continued)

(51) Int. Cl.
*H04B 3/54* (2006.01)
*H04B 15/00* (2006.01)

(52) U.S. Cl.
CPC .............. *H04B 3/54* (2013.01); *H04B 15/00* (2013.01); *H04B 2203/5425* (2013.01);
(Continued)

(58) Field of Classification Search
CPC ............. H04B 3/54; H04B 3/542; H04B 3/56
See application file for complete search history.

(56) References Cited

U.S. PATENT DOCUMENTS 4,479,215 A    10/1984  Baker
4,766,219 A     8/1988  Orvik et al.
(Continued)

OTHER PUBLICATIONS

Broadband Powerline Communications Systems A Background Brief, Sep. 2003, Australian Communications Authority, Document SP 11/03.

*Primary Examiner* — Shuwang Liu
*Assistant Examiner* — Gina M McKie
(74) *Attorney, Agent, or Firm* — Chiesa Shahinian & Giantomasi PC (57) ABSTRACT

A broadband powerline communication system makes use of knowledge of the spectrum characteristics of a local radio environment in order to improve system performance. A determination is made of the spectrum characteristics of a radio environment in the vicinity of the broadband powerline communication system that is transmitting data on modulated carrier frequencies. In order to avoid interference, certain ones of the carrier frequencies otherwise used by the broadband powerline communication system may be selectively masked based on the determination. The spectrum characteristics may be determined 1) in advance and used to compile a configuration database comprising frequency masking parameters; 2) by monitoring the local radio environment using the transmitter/receiver nodes of the system; or 3) based upon receipt of an indication from a conflicting user that the user is experiencing interference. Various combinations of these spectrum characteristic determination techniques may also be used.

20 Claims, 3 Drawing Sheets

Related U.S. Application Data continuation of application No. 11/074,221, filed on Mar. 7, 2005, now Pat. No. 9,172,429.

(60) Provisional application No. 60/632,326, filed on Dec. 1, 2004.

(52) U.S. Cl.
CPC ............. *H04B 2203/5441* (2013.01); *H04B 2203/5458* (2013.01); *H04B 2203/5483* (2013.01)

(56) References Cited

U.S. PATENT DOCUMENTS

| | | | |
|---|---|---|---|
| 4,768,219 A | 9/1988 | Yamagata et al. | |
| 5,066,939 A | 11/1991 | Mansfield | |
| 5,245,633 A | 9/1993 | Schwartz et al. | |
| 5,404,127 A | 4/1995 | Lee et al. | |
| 5,515,419 A | 5/1996 | Sheffer | |
| 5,684,450 A | 11/1997 | Brown | |
| 5,847,447 A | 12/1998 | Rozin et al. | |
| 5,864,284 A | 1/1999 | Sanderson | |
| 5,929,750 A | 7/1999 | Brown | |
| 5,933,071 A | 8/1999 | Brown | |
| 5,949,327 A | 9/1999 | Brown | |
| 5,952,814 A | 9/1999 | Van Lerberghe | |
| 5,978,371 A | 11/1999 | Mason et al. | |
| 5,982,276 A | 11/1999 | Stewart | |
| 6,040,759 A | 3/2000 | Sanderson | |
| 6,130,896 A | 10/2000 | Lueker et al. | |
| 6,137,412 A | 10/2000 | Herzer | |
| 6,141,634 A | 10/2000 | Flint et al. | |
| 6,144,292 A | 11/2000 | Brown | |
| 6,157,292 A | 12/2000 | Piercy et al. | |
| 6,172,597 B1 | 1/2001 | Brown | |
| 6,282,405 B1 | 8/2001 | Brown | |
| 6,297,729 B1 | 10/2001 | Abali et al. | |
| 6,297,730 B1 | 10/2001 | Dickinson | |
| 6,317,031 B1 | 11/2001 | Rickard | |
| 6,331,814 B1 | 12/2001 | Albano et al. | |
| 6,385,434 B1 | 5/2002 | Chuprun et al. | |
| 6,396,392 B1 | 5/2002 | Abraham et al. | |
| 6,396,393 B2 | 5/2002 | Yuasa | |
| 6,404,773 B1 | 6/2002 | Williams et al. | |
| 6,404,822 B1 | 6/2002 | Ben-Michael et al. | |
| 6,417,669 B1 | 7/2002 | Champlin | |
| 6,417,762 B1 | 7/2002 | Comer | |
| 6,449,318 B1 | 9/2002 | Rumbaugh | |
| 6,452,482 B1 | 9/2002 | Cern et al. | |
| 6,459,692 B1 | 10/2002 | Ben-Michael et al. | |
| 6,492,897 B1 | 12/2002 | Mowery | |
| 6,496,104 B2 | 12/2002 | Kline | |
| 6,507,573 B1 | 1/2003 | Brandt et al. | |
| 6,515,485 B1 | 2/2003 | Bullock et al. | |
| 6,522,626 B1 | 2/2003 | Greenwood | |
| 6,549,120 B1 | 4/2003 | De Buda | |
| 6,590,493 B1 | 7/2003 | Rasimas et al. | |
| 6,646,447 B2 | 11/2003 | Cern et al. | |
| 6,784,790 B1 | 8/2004 | Lester | |
| 7,076,378 B1 | 7/2006 | Huebner | |
| 7,145,440 B2 | 12/2006 | Gerszberg et al. | |
| 7,158,013 B2 | 1/2007 | Schwager et al. | |
| 7,366,088 B2 | 4/2008 | Bolinth et al. | |
| 7,414,518 B2 | 8/2008 | Kline | |
| 7,773,947 B2 | 8/2010 | Gerlach | |
| 8,331,312 B2 | 12/2012 | Hart et al. | |
| 8,644,271 B2 * | 2/2014 | Rich | H04W 74/06 370/328 |
| 2001/0045888 A1 | 11/2001 | Kline | |
| 2001/0052843 A1 | 12/2001 | Wiesman et al. | |
| 2001/0054953 A1 | 12/2001 | Kline | |
| 2002/0002040 A1 | 1/2002 | Kline et al. | |
| 2002/0010870 A1 | 1/2002 | Gardner | |
| 2002/0024423 A1 | 2/2002 | Kline | |
| 2002/0027496 A1 | 3/2002 | Cern et al. | |
| 2002/0048368 A1 | 4/2002 | Gardner | |
| 2002/0049368 A1 | 4/2002 | Ritland | |
| 2002/0075797 A1 | 6/2002 | Kilani | |
| 2002/0094044 A1 | 7/2002 | Kolze et al. | |
| 2002/0095662 A1 | 7/2002 | Ashlock et al. | |
| 2002/0097953 A1 | 7/2002 | Kline | |
| 2002/0098867 A1 | 7/2002 | Meiksin et al. | |
| 2002/0098868 A1 | 7/2002 | Meiksin et al. | |
| 2002/0105413 A1 | 8/2002 | Cern et al. | |
| 2002/0109585 A1 | 8/2002 | Sanderson | |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0154000 A1 | 10/2002 | Kline | |
| 2003/0007576 A1 | 1/2003 | Alavi et al. | |
| 2003/0053477 A1 | 3/2003 | Kim et al. | |
| 2003/0073424 A1 | 4/2003 | Nunally | |
| 2003/0096577 A1 | 5/2003 | Heinonen et al. | |
| 2003/0157908 A1 | 8/2003 | Dalal | |
| 2003/0160684 A1 | 8/2003 | Cern | |
| 2003/0174659 A1 | 9/2003 | Handelman | |
| 2003/0190110 A1 | 10/2003 | Kline | |
| 2003/0201759 A1 | 10/2003 | Cern | |
| 2003/0201873 A1 | 10/2003 | Cern | |
| 2003/0210135 A1 | 11/2003 | Cern | |
| 2003/0222747 A1 | 12/2003 | Perkinson et al. | |
| 2003/0222748 A1 | 12/2003 | Cern et al. | |
| 2003/0224784 A1 | 12/2003 | Hunt et al. | |
| 2004/0032320 A1 | 2/2004 | Zalitzky et al. | |
| 2004/0190460 A1 | 9/2004 | Gaskill | |
| 2004/0203392 A1 | 10/2004 | Hsu et al. | |
| 2005/0035850 A1 | 2/2005 | Schwager | |
| 2005/0075076 A1 | 4/2005 | Grun | |
| 2006/0022815 A1 | 2/2006 | Fischer et al. | |
| 2006/0114925 A1 | 6/2006 | Gerszberg et al. | |
| 2006/0175407 A1 | 8/2006 | Kinoshita | |
| 2007/0025266 A1 | 2/2007 | Riedel et al. | |
| 2007/0064788 A1 | 3/2007 | Yonge | |
| 2007/0135147 A1 | 6/2007 | Declerck et al. | |
| 2007/0222637 A1 | 9/2007 | Davidow | |
| 2007/0250369 A1 | 10/2007 | Hwang et al. | |
| 2008/0153430 A1 | 6/2008 | Yonge | |
| 2009/0094044 A1 | 4/2009 | Peterson | |
| 2009/0129331 A1 | 5/2009 | Wu et al. | |
| 2010/0305249 A1 | 12/2010 | Hill | |
| 2012/0015659 A1 | 1/2012 | Kalyani et al. | |
| 2012/0093240 A1 | 4/2012 | McFarland | |
| 2012/0126790 A1 * | 5/2012 | Sobotka | G01D 4/002 324/119 |
| 2012/0149363 A1 | 6/2012 | Faerber et al. | |

* cited by examiner

| TIME/DATE RANGE | TRANSMITTER/RECEIVER NODE PAIRS | MASKED FREQUENCIES |
|---|---|---|
| T,F, 6–8PM | 17436, 17437 | 5–7 MHz |
| ⋮ | ⋮ | ⋮ |

INTERFERENCE CONTROL IN A BROADBAND POWERLINE COMMUNICATION SYSTEM

This application is a continuation of prior U.S. patent application Ser. No. 14/863,811 filed Sep. 24, 2015, which is a continuation of prior U.S. patent application Ser. No. 11/074,221 filed Mar. 7, 2005 and issued as U.S. Pat. No. 9,172,429 on Oct. 27, 2015, which claims the benefit of U.S. Provisional Application No. 60/632,326 filed Dec. 1, 2004, the disclosures of which are herein incorporated by reference in their entirety.

BACKGROUND OF THE INVENTION

The present invention relates generally to broadband powerline communication systems, and more particularly to interference control in a broadband powerline communication system.

The use of power lines to transmit data is known. Initially, powerline communication systems were limited to relatively low data rates, typically less than 500 kbs. These low data rates are generally useful for applications such as remote control of various switches connected to the powerline system. More recently, developments have been made in the area of broadband powerline communication systems, also known as powerline telecommunications (PLT) systems or broadband powerline (BPL) systems. These systems are capable of transmitting data at significantly higher data rates than previous systems. For example, BPL systems can transmit data at rates of 4-20 Mbps.

While existing powerline systems are capable of transmitting data at the rates described above, they were not initially designed for data transmission. Instead, they were designed to carry large currents at high voltages so that significant amounts of energy could be distributed at one primary low frequency (e.g., 60 Hertz).

Powerline communication systems generally use one or more carrier frequencies in order to spread the data transmission over a wider range of frequencies. The low data rate powerline communication systems discussed above generally utilized frequencies in the range of 9 kHz to 525 kHz. In this frequency range the risk of emissions is low primarily because the wavelengths used in the signaling are long with respect to the typical cable lengths in the system. However, the high data rates of BPL systems cannot be achieved using carrier frequencies below 525 kHz. Instead, BPL systems typically use carrier frequencies in the range of 1-30 MHz. At these higher frequencies the powerline cables become more effective radiators of electromagnetic waves.

One of the problems with a BPL system is the risk of interference, both outbound and inbound. Outbound interference refers to interference to radio communications services caused by the generation of electromagnetic emissions from the powerlines over which the BPL system operates. Inbound interference refers to the detrimental effects of inbound interference from external electromagnetic radiators. The physical attributes of the powerlines (e.g., high elevation and unshielded wiring) along with the higher carrier signal frequencies needed for high bandwidth data transmission, contribute to this interference problem.

BRIEF SUMMARY OF THE INVENTION

The present invention provides improved techniques for reducing interference in a broadband powerline communication system whereby knowledge of the spectrum characteristics of a local radio environment are used in order to improve the performance of a BPL system. In accordance with the principles of the invention, a determination is made of the spectrum characteristics of a radio environment in the vicinity of a broadband powerline communication system that is transmitting data on modulated carrier frequencies. Since the frequencies used by the broadband powerline communication system are shared with other users, and not used exclusively by the broadband powerline communication system, knowledge of spectrum usage by potentially conflicting users may be used to reduce interference. More particularly, certain ones of the carrier frequencies otherwise used by the broadband powerline communication system may be masked (i.e., not used) by all or part of the broadband powerline system in order to avoid interference.

In a first embodiment of the invention, the spectrum characteristics in the vicinity of the broadband powerline system are determined in advance and used to compile a database of known conflicting users and the characteristics of their spectrum usage. The compilation and analysis of this information will allow for the maintenance of a configuration database comprising frequency masking parameters which may be used in order to dynamically configure the broadband powerline communication system. The frequency masking parameters may include, for example, the particular frequency or frequencies used, the days and/or times the frequencies are used, and the geographic area in which the conflicting use may result in interference. Using this information, the system may mask out particular frequencies, in particular geographic locations, at particular times, in order to reduce interference. In one embodiment of the invention, an interference controller node controls the frequency masking by transmitting control instructions to particular transmitter/receiver nodes based on the frequency masking parameters in the database.

In a second embodiment of the invention the radio environment in the vicinity of the broadband powerline communication system is monitored in order to detect conflicting users. Certain ones of the carrier frequencies are then masked based on the monitoring. In a particular embodiment, the monitoring is performed by the transmitter/receiver nodes by monitoring the various received frequencies to determine if there is interference present on any of the frequency channels. This monitoring may be performed during a so-called quiet period, during which the transmitter/receiver nodes are not transmitting data, but only listening for received signals on the broadband powerline communication system. In one embodiment, the monitoring process may be initiated by an interference controller node sending a control instruction to the transmitter/receiver nodes. The transmitter/receiver nodes may send the interference information to the interference controller node whereby the interference controller node determines appropriate frequency masks and sends frequency masking control instructions to the transmitter/receiver nodes.

In a third embodiment, frequency masks may be initiated based upon receipt of an indication from a conflicting user that the user is experiencing interference. In accordance with this embodiment, the broadband powerline communication system transmits a unique identifier on at least one of the carrier frequencies used by the system. Receipt of this identifier by a user indicates that the user is receiving interference from the broadband powerline communication system. When the broadband powerline communication system receives a notification that a user has received the identifier, then the system may mask appropriate carrier frequencies based on the receipt of the identifier from the conflicting user. In a particular embodiment, the unique identifier may be some code, for example, that uniquely identifies the BPL system or the service provider operating the BPL system. The identifier may include other information as well. The identifier may be pre-programmed into each of the transmitter/receiver nodes of the system. Alternatively, the identifier, along with an instruction to transmit the identifier, may be sent in a control instruction from the interference controller.

These and other advantages of the invention will be apparent to those of ordinary skill in the art by reference to the following detailed description and the accompanying drawings.

DETAILED DESCRIPTION

Figure 1:
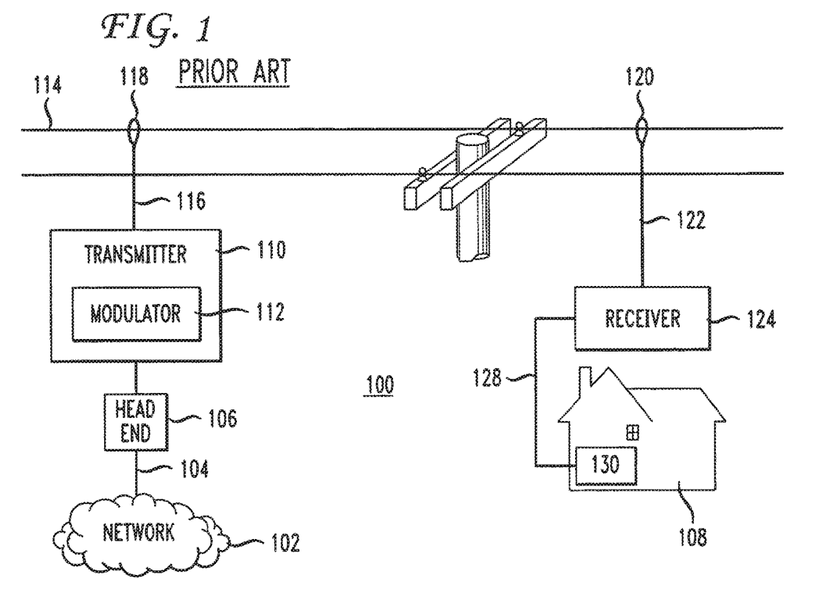
FIG. 1 shows a prior art broadband powerline communication system.

A typical prior art powerline communication system 100 is shown in FIG. 1. A head end network node 106 is connected to a data network 102 via a fiber optic cable 104. In accordance with a typical network service, the head end 106 is configured to transmit data to end user premises (e.g., premises 108) using powerline cables as the transmission medium. The head end 106 is also configured to convert signals in the optical domain received from fiber 104 to the electrical domain using well known optical to electrical conversion techniques. The head end 106 is connected to a transmitter 110. The transmitter 110 contains a modulator 112 which modulates the data received from head end 106 onto a carrier signal using well known RF modulation techniques. As described above, typical carrier frequencies for a powerline communication system are in the range of 2-30 MHz. The modulated signal is provided to the powerline cable 114 via line 116 and coupler 118. A powerline communication system 100 of the type shown in FIG. 1 may use orthogonal frequency division multiplexing (OFDM) in which the available bandwidth is split up into multiple narrowband channels which do not interfere with each other. Thus, in accordance with OFDM transmission, multiple carrier signals, each having its own frequency band and representing a distinct data channel, are carried over the cable 114.

For purposes of the present description, it is assumed that the powerline cable 114 is a medium voltage (MV) powerline cable typically supplying power at 4-66 kV. Such medium voltage cable is typically an aluminum cable having a 1 cm diameter. Coupler 118 couples the modulated carrier signal supplied by line 116 to the MV line 114. Various types of couplers 118 are known in the art. For example, coupler 118 may be an inductive coupler, a capacitive coupler, or may employ direct metallic contact. One type of coupler which may be used is a coupler as described in co-pending U.S. patent application Ser. No. 10/963,144, filed Oct. 12, 2004, entitled Broadband Coupler Technique for Electrical Connection to Power Lines. The carrier signal is transmitted along the length of MV powerline cable 114 to coupler 120 which couples the signal from the MV powerline cable 114 to a receiver 124 via line 122.

The signal from receiver 124 is provided to the premises 108 via low voltage (LV) powerline 128. The low voltage powerline typically supplies power at 100-240 volts. Thus, one of the functions of the receiver is to translate the data from the MV line to the LV line. The low voltage line 128 is connected to a modem 130 within the premises 108. The modem 130 demodulates the signal received from the MV powerline cable 114 and extracts the data that was transmitted from the head end 106. It is noted that in particular embodiments, it is possible that the receiver 124 further functions to demodulate the data and deliver it to a second transmitter (not shown) that would re-modulate the data and send it to the premises 108.

It is noted that for ease of description only downstream (i.e., from head end to end user) data transmission is shown and described. One skilled in the art would readily recognize that upstream transmission could be accomplished in a similar manner. Thus, in a bidirectional system, transmitter 110 and receiver 124 may each be implemented as a transmitter/receiver.

Figure 2:
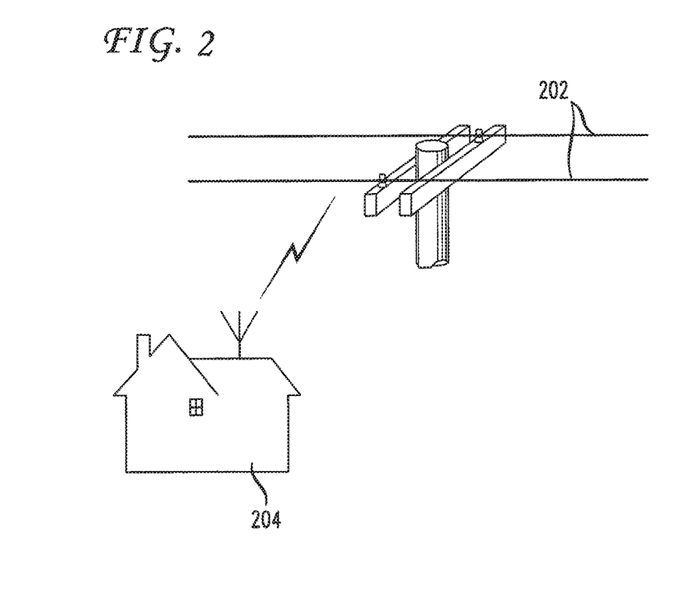
FIG. 2 illustrates interference in a broadband powerline communication system and shows powerlines and user premises.

As described above in the background section, one of the problems with BPL systems as shown in FIG. 1 is the effect of both inbound and outbound interference. FIG. 2 illustrates this problem by showing the powerlines 202 which are part of a BPL system and user premises 204, both of which are making use of the same RF frequency spectrum. Since the frequency spectrum used by a typical BPL system is not used solely by the BPL system, there is the potential for interference as illustrated in FIG. 2. The user premises 204 represents a user that is operating in the vicinity of the BPL system and is using at least a portion of the same frequency spectrum as the BPL system. As used herein, the term conflicting user is used to identify any user or user device that is using at least some frequencies that are also used by the BPL system. If the conflicting user 204 is operating in the vicinity of the BPL system, then there is the potential for two types of interference. Transmissions from conflicting user 204 may be received by the powerlines 202 and thus interfere with communications on the BPL system (referred to as inbound interference) and transmissions on the BPL system may be radiated from the powerlines 202 and received by the conflicting user 204 causing interference to the conflicting user (referred to as outbound interference). As seen from this discussion, the term conflicting user is used to identify a user that either causes (or has the potential to cause) interference to the BPL system, or receives (or has the potential to receive) interference from the BPL system. Further, the use of the term inbound or outbound interference is used with respect to the BPL system and as such, outbound interference from the BPL system would be inbound interference to the conflicting user, and inbound interference to the BPL system would be outbound interference from the conflicting user. As would be readily understood by one skilled in the art, the term inbound or outbound is only relevant if the point of reference is known. Unless otherwise indicated herein, the point of reference used herein is that of the BPL system. As used herein, the phrase—in the vicinity of a BPL system—means within a geographic area where there is potential inbound or outbound interference with respect to the BPL system.

Figure 3:
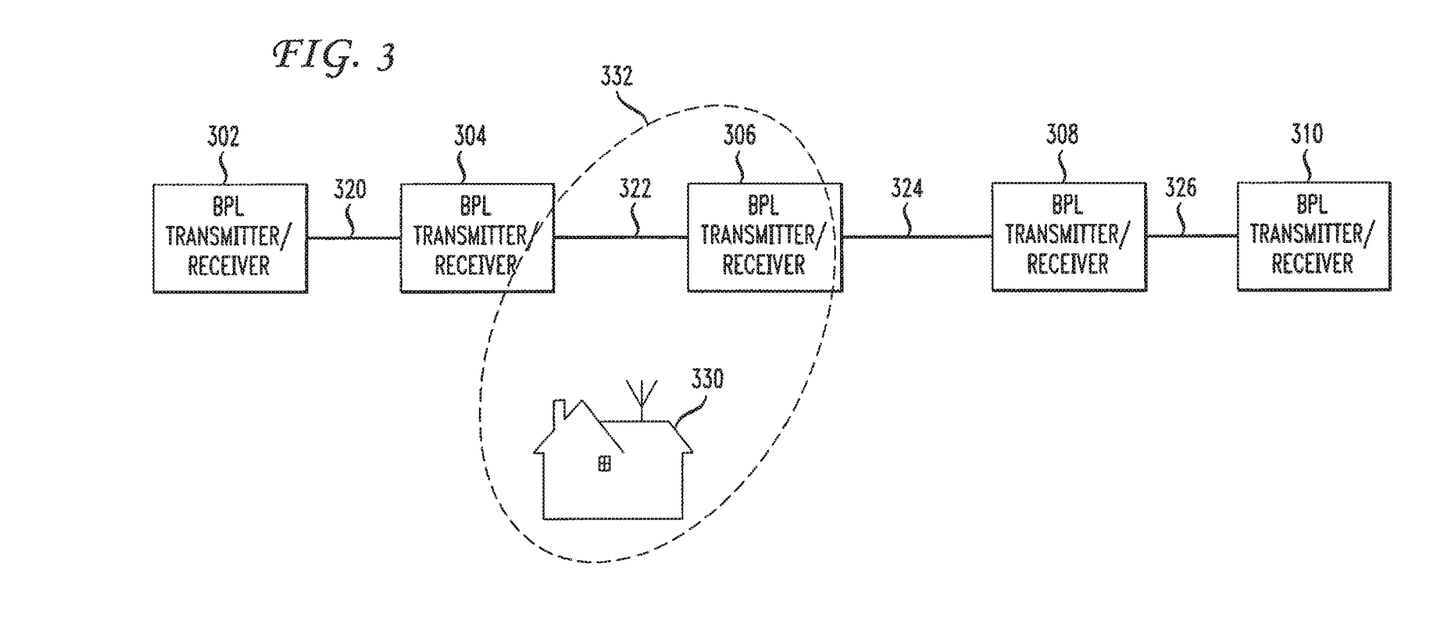
FIG. 3 shows a schematic block diagram of a broadband powerline communication system.

A schematic block diagram of a BPL system is shown in FIG. 3 in order to further describe the spectrum characteristics of a radio environment in the vicinity of a BPL system.

The BPL system of FIG. 3 shows a number of BPL transmitter/receiver nodes 302, 304, 306, 308, 310 connected by powerlines 320, 322, 324, 326 as shown. Each of the transmitter/receiver nodes is capable of both transmission and receipt of modulated data on various frequencies as described above in conjunction with FIG. 1. Thus, each of the transmitter/receiver nodes 302, 304, 306, 308, 310 combines the transmitter and receiver functionality into a single node. Thus, in exemplary operation, node 302 will transmit data via powerline 320 to node 304, node 304 will receive the transmitted data and will then transmit the data to node 306 via powerline 322. This functionality continues and the data will propagate along the BPL system. The data transmission between any two transmitter/receiver nodes may use frequencies which are the same as, or different from, the data transmission between any two other nodes. This becomes especially useful in the presence of a conflicting user. For example, consider conflicting user 330 in the vicinity of the BPL system as shown in FIG. 3. If conflicting user 330 is transmitting on frequency channel x, then powerline 322 will receive this transmitted signal which will result in interference in the communication channel between transmitter/receiver node 304 and transmitter/receiver node 306 if these nodes are using frequency channel x for data transmission via powerline 322. However, frequency channel x may continue to be used for data transmission between other transmitter/receiver nodes (e.g., between transmitter/receiver node 306 and transmitter/receiver node 308 via powerline 324) because the interfering signal from conflicting user 330 is not strong enough to cause substantial interference on powerline 324. As illustrated in FIG. 3, the area of interference 332 usually encompasses only a limited area. It is to be noted that the area of interference with respect to any particular conflicting user may be different for inbound interference and outbound interference due to the fact that the power of interfering signals radiated from the BPL system may be different than the power of interfering signals radiated from the conflicting user.

The converse situation is similar, in which the BPL system is transmitting data on frequency channel x between transmitter/receiver nodes 304 and 306 via powerline 322, and is therefore radiating signals into the vicinity of the BPL system on channel x. As such, conflicting user 330 will receive this transmitted signal which will result in interference at the conflicting user 330. However, frequency channel x may continue to be used for data transmission between other transmitter/receiver nodes (e.g., between transmitter/receiver node 306 and transmitter/receiver node 308 via powerline 324) without interfering with conflicting user 330 because the interfering signal radiating from powerlines other than powerline 322 will not be strong enough to cause substantial interference at conflicting user 330. Again, as illustrated in FIG. 3, the area of interference 332 usually encompasses only a limited area.

In view of the above, knowledge of the spectrum characteristics of a local radio environment can be used in order to improve the performance of a BPL system in accordance with the principles of the present invention. In accordance with the principles of the invention, a determination is made as to the spectrum characteristics of a radio environment in the vicinity of a BPL system that is transmitting data on modulated carrier frequencies. Since the frequencies used by the BPL system are shared with other users, and not used exclusively by the BPL system, knowledge of spectrum usage by interfering users may be used to reduce interference. More particularly, certain ones of the carrier frequencies otherwise used by the BPL system may be masked (i.e., not used) by all or part of the BPL system in order to avoid interference. Further details of the present invention will now be described in accordance with several illustrative embodiments.

In a first embodiment of the invention, the spectrum characteristics in the vicinity of the BPL system may be determined in advance and used to compile a database of known conflicting users and the characteristics of their spectrum usage. Various information may be compiled in accordance with this embodiment of the invention. For example, and without limitation, such information about a conflicting user may include: the particular frequency or frequencies used, the days and/or times the frequencies are used, the geographic area in which the conflicting user's transmitted signals may be strong enough to interfere with the BPL system, and the geographic area in which the BPL system's transmitted signals may be strong enough to interfere with the conflicting user. The compilation and analysis of this information will allow for the maintenance of a configuration database which may be used in order to dynamically configure the BPL system. If conflicting uses of the radio spectrum in a particular geographic area are known in advance, then those conflicting uses can be avoided by masking certain radio frequencies in portions of the BPL system. For example, returning to the example of FIG. 3, if it is known that conflicting user 330 is transmitting or receiving on frequency channel x, and area of interference 332 with respect to this conflicting user is also known, then the BPL system may mask out frequency channel x within the area of interference 332.

Additional information about the conflicting use may also be used in order to configure the BPL system. For example, it may be known that the conflicting use of a particular frequency channel by a particular conflicting user only occurs on certain days, certain times, or some combination of days and times. This information may be used in order to mask out certain frequencies only when necessary to avoid the interference, so that the full spectrum may continue to be used at other times.

This information may be compiled in various ways. For example, a survey of the geographic area in the vicinity of the BPL system may be made by technicians using various radio monitoring equipment so that over some period of time the spectrum usage characteristics may be determined. Alternatively, potential conflicting users in the geographic area may supply information as to their usage of the radio spectrum. Another alternative is that the BPL system may detect various types of conflicting use over time and collect this information for later use. Yet another alternative is that some central authority may notify the service provider operating the BPL system about local spectrum usage.

Figure 4:
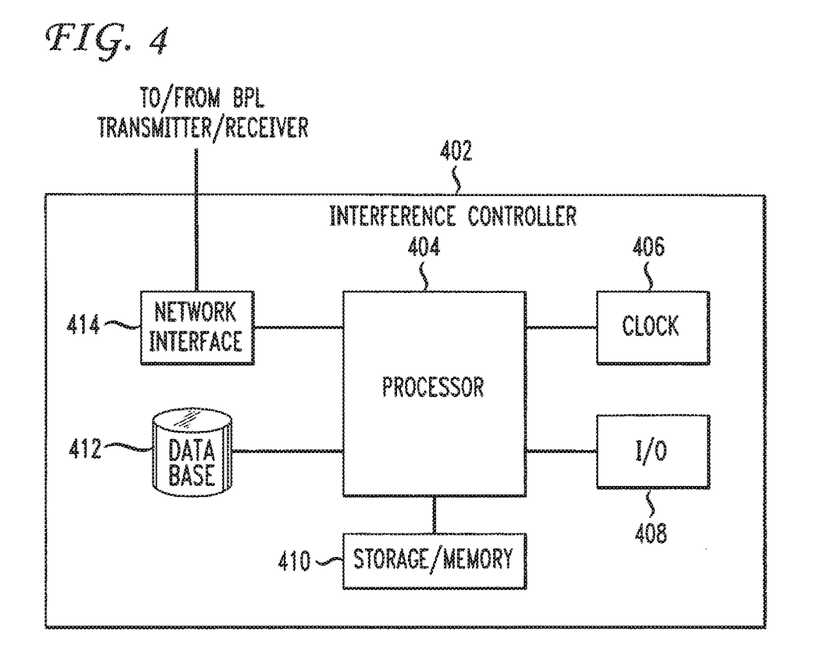
FIG. 4 shows a block diagram of an interference controller.

An apparatus which may be used in order to implement an embodiment of the invention is shown in FIG. 4. FIG. 4 shows an interference controller 402. The components of interference controller 402 will be described herein at a high level using a functional description in order to convey an understanding of the function of interference controller 402. Using this description, one skilled in the art could readily implement an interference controller 402 using various hardware, software, and combinations of hardware and software. One such implementation could include a programmable computer of the type which is well known in the art. Returning to FIG. 4, the overall operation of interference controller 402 is controlled by a processor 404 which operates to control the interference controller 402 by executing stored computer program code which defines the desired operation. The stored computer program code is stored in storage/memory 410 which may be implemented using any type of computer readable medium, including magnetic, electrical, optical, or other type of media. Processor 404 is also connected to a database 412 (database 412 is shown separately as a functional entity, but one skilled in the art will recognize that database 412 may be implemented using separate storage and logic components, or it may be integrated into storage/memory 410). Database 412 defines parameters for frequency masking in order to reduce interference in the vicinity of the BPL system. These parameters may be determined based on the above described compiled spectrum usage characteristics.

Figure 5:
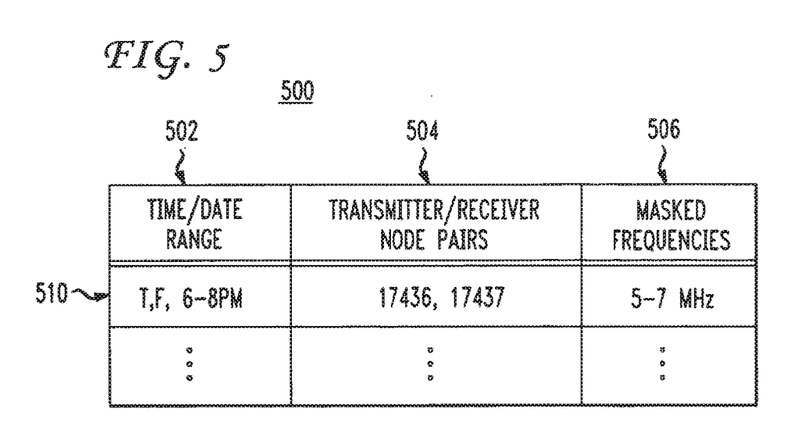
FIG. 5 shows an exemplary data structure for a database comprising frequency masking parameters.

One particular exemplary data structure for database 412 is shown in FIG. 5. The database 500 shown in FIG. 5 contains various fields which are used in order to control the masking of frequencies in the BPL system. Field 502 contains a time/date range, field 504 contains transmitter/receiver node identifications, and field 506 contains a list of masked frequencies. One exemplary record in database 500 is shown as record 510. The time/date range field 502 of record 510 indicates that the mask is to be effective on Tuesdays and Fridays from 6-8 pm. As an example, this type of mask may be used if there is a conflicting user in the form of a HAM radio operator who operates his/her radio station only on Tuesday and Friday evenings. Field 504 of record 510 identifies the particular BPL transmitter/receiver nodes that are affected by this mask. More particularly, field 504 indicates pairs of adjacent transmitter/receiver nodes, such that an identified pair of adjacent transmitter/receiver nodes do not communicate with each other via a masked frequency. In the particular case of record 510, the interference area involves the path between two transmitter/receiver nodes (having identifications 17436 and 17437). Field 506 identifies the particular frequency channels to be masked. In the example of FIG. 5, the masked frequencies are directly specified, but alternatively the masked frequencies may be identified by channel identifiers (e.g., channel A) which have previously been associated with particular frequency ranges. In the example record 510, the frequency range to be masked is the frequency range of 5-7 MHz. Thus, record 510 indicates that on Tuesdays and Thursdays between 6 and 8 PM transmitter/receiver nodes 17436 and 17437 have a mask on the 5-7 MHz frequency range. One skilled in the art will recognize that various combinations of data may be present in the database of FIG. 5 in order to contain information which is functionally equivalent to the information shown in FIG. 5. For example, while the records of database 500 as described contain the days and times that certain frequencies are masked at particular transmitter/receiver nodes, the database could alternatively contain the days and times that certain frequencies are allowed to be used at particular transmitter/receiver nodes. One skilled in the art would recognize that these two uses of database 500 are functionally equivalent, and that other various functionally equivalent alternatives may also be designed. Further, various additional information may be stored in database 500 in various implementations. For example, the name of a HAM (or other) operator as well as relevant FCC licensing information may be stored.

Returning now to FIG. 4, the interference controller 402 uses the information in database 412 in order to determine the necessary frequency masking for a BPL system. The interference controller 402 utilizes clock 406 in conjunction with database 412 in order to determine when particular frequency masks need to take affect. Interference controller 402 also contains a network interface 414 which is used to communicate instructions to the various transmitter/receiver nodes in the BPL system. The interface controller 402 may be directly connected to the BPL system via a powerline, or alternatively the interference controller 402 may be connected to the various transmitter/receiver nodes via some other network connection (e.g., LAN, WAN, Internet, wireless). Regardless of the particular network connection, the interference controller 402, using its clock 406, internal logic and the contents of database 412, determines when particular frequency masks need to be implemented at particular transmitter/receiver nodes, and sends appropriate control instructions to these particular transmitter/receiver nodes via network interface 414. The transmitter/receiver nodes are configured such that upon receipt of a control instruction from interference controller 402 indicating that a particular frequency should be masked, the transmitter/receiver will stop transmitting and receiving on that frequency.

As shown in FIG. 4, interference controller 402 also contains an I/O module 408 which represents user interface elements (e.g., keyboard, mouse, display screen, etc.) to allow user interaction with the interference controller 402. This allows a user to manually modify the contents of database 412, or to manually send control instructions to the transmitter/receiver modules.

In another embodiment of the invention, the spectrum characteristics in the vicinity of the BPL system are monitored in order to determine appropriate frequency masks for the system. In accordance with this embodiment, the transmitter/receiver nodes monitor the various received frequencies to determine if there is interference (e.g., an incoming signal above some threshold) present on any of the frequency channels. The monitoring may be done by the BPL system turning off all transmissions periodically (i.e., a quiet time) and listening for any received signals during this quiet time. If a signal is received during the quiet time, then it means that it was received from a conflicting user, which is an indication of incoming interference on a particular frequency, and also an indication of possible outgoing interference if the BPL system uses the same frequency. The information about the local radio environment as determined by the individual transmitter/receiver nodes is then transmitted to the interference controller 402 via its network interface 414. As described above, the interference controller 402 may be directly connected to the BPL system via a powerline, or alternatively the interference controller 402 may be connected to the various transmitter/receiver nodes via some other network connection (e.g., LAN, WAN, Internet, wireless).

Upon receipt of the information from the various transmitter/receiver nodes, the interference controller 402 determines which frequency channels to mask for particular transmitter/receiver nodes. In one embodiment, the interference controller 402 may determine to mask out interfering frequencies within a particular interference area for a particular time period. After the time period, the controller 402 may institute another quiet period to listen for interference, and adjust the frequency masks as necessary to adapt to the new local radio environment. The control of the above described monitoring activity may be controlled and coordinated via the interference controller 402, whereby the interference controller 402 sends appropriate control instructions to the transmitter/receiver nodes to control the monitoring and associated masking. For example, the initiation of the quit period and the monitoring for interference can be performed by the transmitter/receiver nodes in response to receipt of a control instruction from interference controller 402. Alternatively, the transmitter/receiver nodes could be configured to perform the monitoring on some predetermined schedule. One skilled in the art would recognize that there are various alternatives possible for this monitoring. For example, all frequency channels could be monitored for interference during each quiet period, or alternatively, some subset of the frequency channels could be monitored.

The monitoring of the local radio environment as described above is particularly advantageous to detect and compensate for unpredictable interference situations (e.g., emergency use of various frequency bands).

In accordance with another embodiment of the invention, frequency masks may be initiated based upon receipt of an indication from a conflicting user that the user is experiencing interference. In an advantageous embodiment, this is an indication that the conflicting user has received an identifier associated with the BPL system. In accordance with this embodiment, the BPL system periodically transmits a unique identifier on one or more frequencies. The unique identifier may be some code, for example, that uniquely identifies the BPL system or the service provider operating the BPL system. The identifier may include other information as well. The identifier may be pre-programmed into each of the transmitter/receiver nodes of the system. Alternatively, the identifier, along with an instruction to transmit the identifier, may be sent in a control instruction from the interference controller 402.

Upon receipt of interference (including the unique identifier) on a particular frequency channel, a conflicting user may identify the source of interference by associating the received unique identifier with the BPL system and/or the service provider operating the system. Alternatively, the received unique identifier may be provided to a third party (e.g., local government authority) to determine the source of interference.

When the service provider operating the BPL system receives an indication that its unique identifier has been received, certain appropriate masking of frequency channels may be initiated. For example, a user may use input/output module 408 of interference controller 402 to implement appropriate masking to eliminate the interference. Alternatively, a user may use input/output module 408 to add an appropriate record to database 412 as described above so that appropriate masking will be automatically handled by the interference controller 402 at appropriate times.

The transmission of unique identifiers is advantages to control outbound interference with respect to conflicting users who are receiving RF signals, but who are not transmitting signals. The lack of transmission would mean that the BPL system would not detect any conflicting use by using the monitoring techniques described above. As such, the transmission of an identifier allows the BPL system to mask frequency channels that are interfering with users who are receiving RF signals, but not transmitting. One advantageous use of this embodiment is in an emergency situation, in which local authorities using a particular radio frequency are experiencing interference. These authorities could recognize the unique identifier and therefore identify the source of the interference. The authorities could then contact the service provider operating the BPL system in order to have the service provider mask out the interfering radio frequencies. Alternatively, the local authorities could have direct access to the interference controller 402 (e.g., via network interface 414) and could immediately mask out the interfering radio frequencies themselves. In severe emergency situations, the local authorities could even shut down all RF transmissions on the BPL system via access to the interference controller 402.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, in addition to the masking of certain frequency channels as described above, it is also possible to initiate data transmission on alternate frequency channels upon a determination that certain frequency channels need to be masked. Further, one skilled in the art would recognize that various combinations of embodiments are also possible in accordance with the principles of the present invention.

The invention claimed is:

1. A method comprising:
    determining, over a first time period during which a broadband powerline communication system is not transmitting data over a range of carrier frequencies, first characteristics of usage of a radio environment over the range of carrier frequencies in a vicinity of the broadband powerline communication system;
    compiling a database of the first characteristics of usage; and
    generating a schedule of use of the range of carrier frequencies by a conflicting user based on the first characteristics of usage.

2. The method of claim 1, wherein the first characteristics of usage comprise:
    a geographical area in which the conflicting user interferes with the broadband powerline communication system;
    time intervals during which the conflicting user interferes with the broadband powerline communication system; and
    carrier frequencies used by the conflicting user in the vicinity of the broadband powerline communication system.

3. The method of claim 2, further comprising:
    determining, over a second time period during which the broadband powerline communication system is not transmitting data over the range of carrier frequencies, second characteristics of usage of the radio environment over the range of carrier frequencies in the vicinity of the broadband powerline communication system; and
    updating the database based on the determining, over the second time period, the second characteristics of usage of the radio environment over the range of carrier frequencies in the vicinity of the broadband powerline communication system.

4. The method of claim 3, further comprising:
    updating the schedule of use based on the updating.

5. The method of claim 1, further comprising:
    receiving usage information from a potential conflicting user; and
    updating the database based on the usage information from the potential conflicting user.

6. The method of claim 1, further comprising:
receiving usage information from a central authority; and
updating the database based on the usage information from the central authority.

7. The method of claim 1, wherein the determining the first characteristics of usage further comprises:
monitoring the radio environment to detect conflicting users.

8. An apparatus comprising:
a processor; and
a memory to store computer program instructions, the computer program instructions when executed on the processor cause the processor to perform operations comprising:
determining, over a first time period during which a broadband powerline communication system is not transmitting data over a range of carrier frequencies, first characteristics of usage of a radio environment over the range of carrier frequencies in a vicinity of the broadband powerline communication system;
compiling a database of the first characteristics of usage; and
generating a schedule of use of the range of carrier frequencies by a conflicting user based on the first characteristics of usage.

9. The apparatus of claim 8, wherein the first characteristics of usage comprise:
a geographical area in which the conflicting user interferes with the broadband powerline communication system;
time intervals during which the conflicting user interferes with the broadband powerline communication system; and
carrier frequencies used by the conflicting user in the vicinity of the broadband powerline communication system.

10. The apparatus of claim 9, the operations further comprising:
determining, over a second time period during which the broadband powerline communication system is not transmitting data over the range of carrier frequencies, second characteristics of usage of the radio environment over the range of carrier frequencies in the vicinity of the broadband powerline communication system; and
updating the database based on the determining, over the second time period, the second characteristics of usage of the radio environment over the range of carrier frequencies in the vicinity of the broadband powerline communication system.

11. The apparatus of claim 10, the operations further comprising:
updating the schedule of use based on the updating.

12. The apparatus of claim 8, further comprising:
receiving usage information from a potential conflicting user; and
updating the database based on the usage information from the potential conflicting user.

13. The apparatus of claim 8, the operations further comprising:
receiving usage information from a central authority; and
updating the database based on the usage information from the central authority.

14. The apparatus of claim 8, wherein the determining the first characteristics of usage further comprises:
monitoring the radio environment to detect conflicting users.

15. A computer readable storage device storing computer program instructions, which, when executed on a processor, cause the processor to perform operations comprising:
determining, over a first time period during which a broadband powerline communication system is not transmitting data over a range of carrier frequencies, first characteristics of usage of a radio environment over the range of carrier frequencies in a vicinity of the broadband powerline communication system;
compiling a database of the first characteristics of usage; and
generating a schedule of use of the range of carrier frequencies by a conflicting user based on the first characteristics of usage.

16. The computer readable storage device of claim 15, wherein the first characteristics of usage comprise:
a geographical area in which the conflicting user interferes with the broadband powerline communication system;
time intervals during which the conflicting user interferes with the broadband powerline communication system; and
carrier frequencies used by the conflicting user in the vicinity of the broadband powerline communication system.

17. The computer readable storage device of claim 16, the operations further comprising:
determining, over a second time period during which the broadband powerline communication system is not transmitting data over the range of carrier frequencies, second characteristics of usage of the radio environment over the range of carrier frequencies in the vicinity of the broadband powerline communication system; and
updating the database based on the determining, over the second time period, the second characteristics of usage of the radio environment over the range of carrier frequencies in the vicinity of the broadband powerline communication system.

18. The computer readable storage device of claim 17, the operations further comprising:
updating the schedule of use based on the updating.

19. The computer readable storage device of claim 15, the operations further comprising:
receiving usage information from a potential conflicting user; and
updating the database based on the usage information from the potential conflicting user.

20. The computer readable storage device of claim 15, the operations further comprising:
receiving usage information from a central authority; and
updating the database based on the usage information from the central authority.

* * * * *